US008520717B2

(12) United States Patent
Brenner et al.

(10) Patent No.: US 8,520,717 B2
(45) Date of Patent: Aug. 27, 2013

(54) GNSS RECEIVER WITH CROSS-CORRELATION REJECTION

(75) Inventors: Joel Brenner, Arzo (CH); Angelo Genghi, Moltrasio (IT)

(73) Assignee: QUALCOMM Incorporated, San Diego, CA (US)

( * ) Notice: Subject to any disclaimer, the term of this patent is extended or adjusted under 35 U.S.C. 154(b) by 900 days.

(21) Appl. No.: 11/870,146

(22) Filed: Oct. 10, 2007

(65) Prior Publication Data

US 2008/0273578 A1 Nov. 6, 2008

(30) Foreign Application Priority Data

Oct. 26, 2006 (EP) ..................................... 06123044

(51) Int. Cl.
*H04B 1/00* (2006.01)
(52) U.S. Cl.
USPC ........... 375/142; 375/147; 375/150; 375/316; 375/343; 342/352; 342/357
(58) Field of Classification Search
USPC ......... 375/142, 147, 150, 316, 343; 342/352, 342/357
See application file for complete search history.

(56) References Cited

U.S. PATENT DOCUMENTS

| 5,379,224 | A | * | 1/1995 | Brown et al. | 701/215 |
| 5,987,059 | A | * | 11/1999 | Harrison et al. | 375/150 |
| 7,209,076 | B2 | * | 4/2007 | Roh | 342/357.59 |
| 7,680,178 | B2 | * | 3/2010 | Raman et al. | 375/150 |
| 2002/0064209 | A1 | | 5/2002 | Turetzky et al. | |
| 2007/0177699 | A1 | * | 8/2007 | Fite et al. | 375/355 |

FOREIGN PATENT DOCUMENTS

| EP | 1 198 068 A1 | 4/2002 |
| JP | 2004527763 A | 9/2004 |
| WO | 02096054 A1 | 11/2002 |
| WO | WO 2005/003807 A1 | 1/2005 |

OTHER PUBLICATIONS

Zheng et al "GPS Software Receiver Enhancements for Indoor Use" Proceedings of ION GNSS Sep. 2005.*
European Search Report—EP06123044—Search Authority—Munich—Jan. 31, 2007.
Phocas M et al., "GPS Jamming—the Enemy Inside!" ION GNSS. International Technical Meeting of the Satellite Division of the Institute of Navigation, Washington, DC, US, No. 17th conf , Sep. 21, 2004, pp. 156-165, XP007901537 p. 159, fig. 5 and par. 1-2.

\* cited by examiner

*Primary Examiner* — Leon Flores
(74) *Attorney, Agent, or Firm* — Howard Seo (57) ABSTRACT

Radiolocalization receiver having a plurality of correlation taps, and including a module of cross-correlation detection in which spurious correlation terms are detected by statistical analysis of the frequencies of the candidate peaks. The system can restrict further integration to those taps whose frequency is outside the cross-interference signal, or trigger new acquisition of different space vehicles, upon detection of a cross-interference situation.

24 Claims, 5 Drawing Sheets

GNSS RECEIVER WITH CROSS-CORRELATION REJECTION

REFERENCE DATA

The present application claims priority form European Patent Application No EP06123044 filed on Oct. 26, 2007.

FIELD OF THE INVENTION

The embodiments of the present invention are concerned with devices and methods for the acquisition of radio signals from a constellation of orbiting satellites or other mobile or fixed beacons, in a mobile geolocalization receiver.

Particular embodiments of the present invention, which will be described in the following, are concerned with the acquisition of GNSS signals, for example from a constellation of GPS or Galileo satellites.
Reference

DESCRIPTION OF RELATED ART

Satellite radiolocalization systems, such as GNSS (Global Navigation Satellite System), GPS (Global Positioning System), GLONASS (GLobal Orbiting Navigation Satellite System) or Galileo (european global satellite navigation system) rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card to be connected to a portable computer, or a GPS card connectable to a PDA or to a portable phone via an appropriate interface like a memory card interface, a USB interface, or a wireless communication interface.

The terms "receiver" and "GPS receiver" should also be understood, in the context of the present invention, as including one of more integrated circuits, arranged to realize a complete GPS receiver or a complete GPS module, as defined above.

The following description relates mostly to the GPS Global Positioning System. The invention is not however limited to this particular system but can also be employed in receivers for radiolocalization systems based on the same principles, for example the GLONASS system or the GALILEO system.

The general functioning of a satellite radiolocalization devices are well known and will be resumed briefly in the description. Reference is also made to patent applications EP 1198068 and WO05003807 in the name of the applicant, which are hereby incorporated by reference.

In the case of GPS radiolocalization system, each of the operational GPS satellites, also indicated as Space Vehicle or SV, transmits a microwave radio signal composed of two carrier frequencies, referenced as "L1" and "L2" frequencies and situated at 1572.42 MHz and 1227.60 MHz respectively. The L1 and L2 carriers are modulated by two digital ranging code sequences, called the C/A (coarse acquisition) code and the P code, the latter being mostly restricted to the US government and military.

The C/A code, which is used by commercial GPS receiver, is modulated in the L1 and in the L2 frequency. The C/A codes, which are unique for each GPS satellite, are pseudo-random Gold codes comprising a repetition of a 1023 bits, or "chips", with a transition rate of 1.023 MHz. The C/A code thus repeats itself every millisecond. The ranging code sequences are synchronized to a common precise time reference, the "GPS time" which is held by precise clocks on board of each satellite, and which are synchronized to a master clock. The C/A codes are pseudo-random noise sequence, and are often indicated in short as PRN. The effect of the PSK modulation with the C/A code is to spread the spectrum of the modulated signal over a 1 MHz bandwidth.

Other radiolocalization systems, for example the proposed Galileo system, also employ similar or equivalent signal structures, based on ranging codes synchronized to a common standard of absolute time. The term "GPS time" is used in the following to designate both the absolute time standard of the GPS system and the time standard of other radiolocalization satellite systems, when the invention is applied to such systems.

Both L1 and L2 carriers further carry a 50 bps navigation message, the NAV code. The navigation message contains, along with other information, the coordinates of the GPS satellites as a function of time, clock corrections, and atmospheric data. The NAV message is encoded by inverting the logical value of the C/A code whenever the NAV bit is "1", and leaving it unaltered otherwise. As it will be seen later, the presence of the NAV code limits the time coherence of the C/A code and thus complicates signal acquisition.

The signal level of the GPS signals is, nominally, −130 dBmW, a value which is further attenuated whenever the view of the sky is obstructed, and especially within buildings. Other satellite navigation systems provide signals of comparable strength. Such levels are well below the thermal noise floor, thus the signal can be received only by use of statistical techniques.

In order to acquire these codes and perform a position fix a GPS receiver generates, for each received satellite, a local replica of the C/A code, the PN code, adjusted to a local NCO running at a frequency close to 1.023 MHz. The code is then time-shifted, correlated with the received signal in a correlation engine of the receiver, and integrated, for a time that can be more or less long according to the noise level, until a peak of correlation value is obtained for a certain value of time-shift, that depends from the distance between the receiver and the satellite.

The amount of time-shift needed to achieve optimal correlation, or pseudo-range, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and time t.

The carrier frequencies of GPS signals are, in addition, shifted from the nominal frequency by an unknown Doppler shift. The acquisition of GPS signals is an inherently time consuming process which involves searching for a correlation peak in a three-dimensional parameter space, whose axes correspond to the satellite identity; frequency and temporal shift of the pseudo-random Gold code. For each search, aimed at a specific satellite, all possible code phases plus all possible frequencies may have to be tried in the correlation circuit until a peak is found. The search process may be shortened if the receiver has some knowledge of its location and of the current positions and speeds of the transmitting satellites. In the worst case, however, the search time can extend to several seconds.

The phase in which the GPS receiver endeavors to localize a sufficient number of satellite signals in the phase offset—Doppler shift space with little or no knowledge of their position is usually named the "acquisition" phase. Once the peaks are found, on the other hand, in the "tracking" phase, the system has only to follow their drift, which is usually done with less difficulty or delay.

Especially in low-signal situation, like for example in buildings, the weakness of the signal imposes longer integration times, in order to determine the presence of a peak. The presence of the NAV message limits the coherent integration time to a maximum of twenty milliseconds, in GPS receivers. Incoherent integrations lasting several seconds are not uncommon.

In order to overcome such difficulties, some receivers adopt a brute force technique aptly named "massive correlation". Depending on the number of correlators, acceptable acquisition times can sometimes be achieved even under low signal power conditions. The term "tap" is generally used to mean the physical circuit element that can perform a single correlation operation between the incoming signal and the replica code with a certain frequency and code offset.

As an example of massive correlation, a "hot start" with a GPS receiver may be considered, wherein the receiver has an estimate of its location and the present time or where there is an estimate of time available through assistance data. Under such conditions, the search space can be equal to the full PN code space (1023 chips for GPS C/A code) and some hundreds of hertz (Hz) in the frequency domain (for example, +/−150 Hz. The search range of a single tap might be, for example, ½ chip in the code space and +/−1/(3T) in the frequency space (where T is the coherent integration time and 2/(3T) is called frequency bin). Thus, to cover the entire search space a set of around 16 thousands taps is needed. Many GPS receivers implement even higher numbers of taps and can search more than one satellite in parallel. Other receivers use fewer taps, but must serialize the search of the single satellite into several steps.

A "massive correlator" receiver is normally used to mean a receiver that has at least the potential to search for the whole code uncertainty (i.e. at least 2046 physical taps) in parallel for one satellite. The search in the frequency domain can be performed using post correlation Fast Fourier Transform (FFT), which is more efficient, as several Doppler shifts can be searched in parallel, or using physical taps, which is quite inefficient especially for high frequency uncertainties.

In such acquisition process, a difficulty arises when a very strong signal from one particular SV, characterized by a specific PRN2 code, is superposed to one or more weak signal from another SV having a different code PRN1. In this case, when the system is trying to acquire the weaker signal, the strong signal produces a series of interference spurious cross-correlation peaks, which can have comparable, or indeed higher strength, than the peak which are actually sought for.

Such spurious peaks are especially problematic, when the strength of the signals received from different Space Vehicles is very uneven, and frequency uncertainties are large, like for example in an indoor environment, or in an urban environment with tall buildings (locations commonly indicated as "urban canyons in particular in low-power radiolocalizations application, in which the receiver is intermittently reacquiring the signals after period spent in a low-power mode.

BRIEF SUMMARY OF THE INVENTION

It is therefore an aim of the present invention to provide a radiolocalization receiver with a superior rejection of spurious cross-correlation signals.

This and other aims of the present invention are provided by the device which is the object of the appended independent claim 1. Dependent claims relating to preferred modes of realization of the present invention. The aims of the invention are also attained by the method which is the object of the corresponding method claim.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
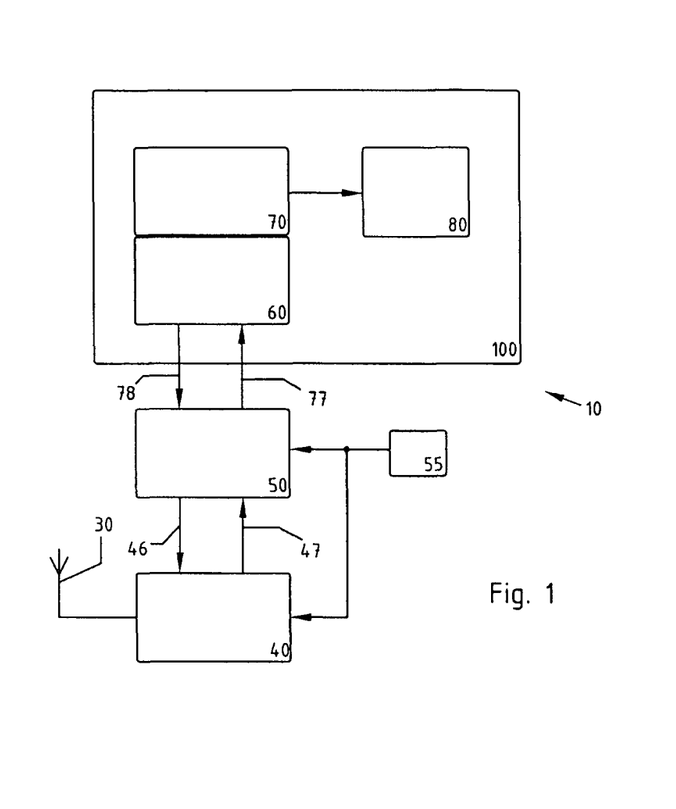
FIG. 1 reproduces, in schematic form, the architecture of a GNSS receiver suitable for the implementation of the invention

FIG. 1 represents schematically the layout of a generic GNSS device 10 comprising one or more antennas 30 which allow coupling with radio signals radiated from different GNSS satellites.

According to FIG. 1, the radiolocalization device 10 of the present invention comprises a RF-receiver or radiofrequency module 40, whose function is to process the signals received from the radiolocalization satellites by the antenna 30. The radiofrequency circuit comprises a single- or multiple-conversion heterodyne radio receiver and provides at his output 47 a navigation signal of low frequency, like a baseband signal, analogue or digital, or a low-IF signal, for example a low-If signal at 4.092 MHz.

According to the modulation scheme of the received satellite constellation, the output 45 will comprise several angular component of the signal. In the case of GPS, for example, two components shifted by 90° are needed, and are conventionally referred to as the I (In-phase) and Q (Quadraphase) component. Other modulation schemes, for example the modulation proposed for the GALILEO system, call for more than two angular components.

The RF module 40 is connected to a main time base generator 55, which provides a stable time base reference for the radiolocalization device 10, for example a 32.734 MHz time base. Since time base generator 55 must be considerably precise and stable to allow acquisition and tracking of the GPS signal, it comprises generally a high-quality temperature compensated crystal oscillator or TCXO.

The output 47 of the RF module 40 is fed to a signal processor 50, also called pseudo-range engine 50 which, in turn, provides control instructions 46 to the RF circuit 40. The function of the pseudo-range engine 50 is to de-spread the signals received from the satellites, by generating, for each received satellite, a local replica of the modulation code (the C/A code in the case of a commercial GPS receiver) which is precisely time-aligned with the received signal. The code shifts, or pseudo-ranges 77, generated by the pseudo-range engine 50 are transmitted to the navigation engine 60, which calculates a fix for position and time coordinates x, y, z, t. The navigation engine also steers the pseudo-range engine 50 by appropriate search instructions 78. The positional fix is usually obtained by iterative Kalman filters, or by other known means, and the navigation engine may need to follow the pseudo-range data 77 along several code periods until a satisfactory solution is found.

Preferably the pseudo-range engine 50 and the RF module 40 are realized as two separate integrated circuits or as a single common integrated circuit.

In the illustrated variant of the invention the navigation engine 60 is part of a host system 100, which also comprises application navigation software 70 and appropriate peripherals 80 for interaction with a user. The radiolocalization device 10 of the invention is, in this case, an extension of the host system, for example in the form of an extension card or module for a cellular phone, a PDA, a game console, a personal computer or any other suitable host device. The invention comprises however also standalone apparatuses which incorporate navigation engine, application software and peripherals together with the RF module and pseudo-range engine. In this case the functions of the navigation engine 60 and of the pseudo-range engine 50 could conveniently be grouped in a single-chip device.

In the case of a multi-standard GNSS radiolocalization device, the received satellites may belong to several satellite constellations, for example to the GPS, Galileo, or GLONASS constellations, and emit in several radio bands.

Preferred embodiments of the invention have circuitry elements or the software equivalents thereof for performing correlation. Such elements, when broken down into abstracted, individual units, may be referred to as "taps", with reference to a classical correlation architecture based on tapped shift registers. It must be kept in mind, however, that the present invention is not limited to this particular architecture, and that the term "tap" designates here an abstract correlation unit, arranged to produce a correlation value, and which may also be partially realized in software.

Advantageously, the receiver of the invention includes a large number of correlation taps, which can be programmed in order to execute, in parallel, a plurality of integrations of signals having different PRN sequences, code shifts, and frequencies. Faster acquisition times may be obtained by judiciously programming and using the available taps in order to concentrate the search on those combination of PRN sequence, code shift and frequency, which are more likely to provide a useful signal, and avoiding to assign taps to regions of the search space which are sterile, for example because of a cross-interference signal.

Figure 2:
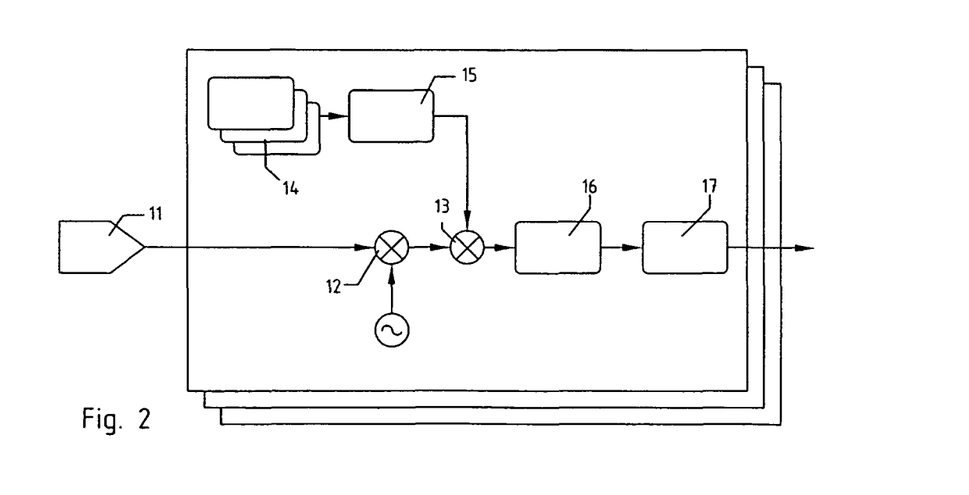
FIG. 2 presents a schematic diagram of a possible realization of single GPS tap.

FIG. 2 shows, by way of example, a possible example of a physical tap with a digital input 11, where digital samples of the received signal are present. If needed, the digital input 11 is supplied to a carrier suppression circuit 12, comprising a mixer and a local oscillator, which removes an estimated or known carrier wave from the digital samples providing a baseband signal. Such carrier suppression circuits are typically shared by a number of different taps. The samples are then supplied to a signal despreader 13.

Despreader 13 has two inputs, one for the baseband signal, while another originates from a replica code generator 14. The code generator provides, by methods known in the art, a local replica of the known PRN code for the particular satellite being searched. The code generation may be serial (one chip after another) or parallel (more than one code chip at one time), or a combination thereof, depending on the correlation method in use. Preferably one code generator will be shared by several taps dedicated to the search of the same satellite.

The local PRN code can be shifted by, for example, shifter 15. Since a single code replicator may be shared by many taps, it is necessary to phase-shift the code so that different taps can correlate the known PN code to different signal positions.

Despreader 13 effectively multiplies the known, phase-shifted PN code generated by code replicator 14 with the signal originating from carrier wipeoff circuit 12. This not only establishes a correlation between the local replica code and the code received at input 11, but also has the effect of de-spreading the signal, if the known PN code is correctly aligned with the signal in the tap of concern, and making it detectable above the noise level.

In a preferred variant, the baseband signal is transformed into its frequency representation by a FFT operation, and multiplied with a corresponding frequency representation of the local PRN code. This allows a higher parallelization and is especially advantageous in a massively parallel architecture.

After despreading at despreader 13, the signal is input into coherent accumulator 16, which effectively integrates the received signal. The integration is coherent because the sign of the received signal is included in the integration. In a GPS environment, however, the NAV signal introduces a random sign change every 20 milliseconds and, therefore, coherent integration can not exceed this time, and is very often limited to 16 ms in order to avoid this sign uncertainty. In other radiolocalization systems the time of coherent integration is likewise limited.

If further accumulation is needed, the result of the coherent integration over a particular time period is then input to a non-coherent integrator 17, which sums the results without regard to sign, as an absolute value or square, for example. Incoherent integration is obviously less effective than coherent integration in bringing the signal over the noise level.

During correlation of a signal, a correlation peak, or a high integration result is sought. The search for very low power signals requires long integration times, for example, 1 to 3 seconds, until a recognizable correlation peak appears. This corresponds to the incoherent sum of hundreds of coherent integrations, depending on the length of the interval chosen for coherent integration.

As a result of noise however, several correlation peaks will be found, one peak corresponding, for example, to the searched signal, while the other derive from statistical noise fluctuations. GNSS receivers generally deal with this situation by performing integration for long periods of time, until a reasonably low number of candidate peaks appear, with reasonable statistical certainty, above the surrounding noise. The one "true" signal peak emerges as the signal having the highest correlation value, for example.

Besides the random thermal noise, the acquisition of the correlation peaks, indicative of the signal of one GNSS satellite is further complicated by the cross-interference deriving from signals received from other satellites. In the GPS system, for example, all the satellites emit on the same carrier frequency and discrimination between different emitters rely on the difference in the relative PRN sequences and Doppler shifts.

In the case of the Gold sequences used in the GPS system, the cross-correlation terms have typically an attenuation of 22 dB. In difficult reception situations, like for example indoors or in an urban canyon, the receiver may have a clear view of some satellites, while other may be received only with a strong attenuation exceeding 22 dB. The cross-correlation signal of strong satellites may thus cover the correlation signal of the weak one and prevent their acquisition.

Figure 7:
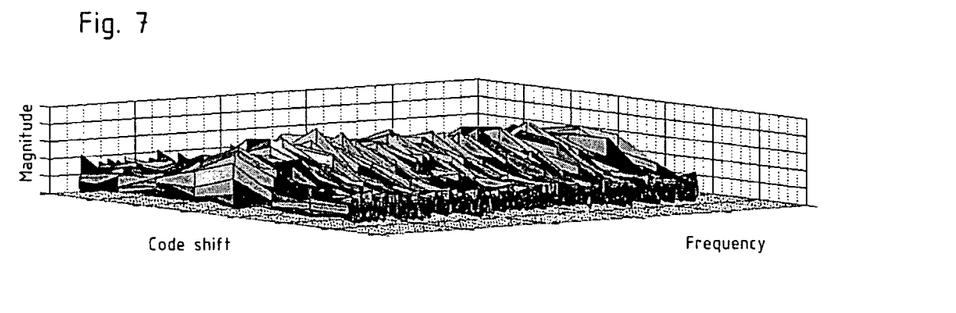
FIGS. 7 and 8 correspond to FIGS. 3 and 4 in the case in which the system receives a signal superposed to random noise and to a cross-interference 9 shows, as a flowchart, a method of rejection of spurious peaks according to one aspect of the invention.

This situation is exemplified by the 3-dimensional plot of FIG. 7, which represents, in a search space of code shift (X axis) versus frequency shift (Y axis) the result (vertical Z axis) of a multiple incoherent integration of a signal which is affected by strong cross-correlation terms. Let us suppose, to fix ideas, that the plot is relative to the acquisition of a particular space vehicle characterized by a PRN1 code, and that a second space vehicle exists, which is modulated by a PRN2 code. Due to the periodicity of the PRN sequences, all the cross-correlation terms have an apparent frequency shift $f_2=f_1+n\cdot1$ kHz where $f_1$ is the frequency shift of the interfering second space vehicle. The cross-correlation signal appears as a ridge of correlation peaks at the same frequencies. The true correlation peak sought for may be completely overwhelmed by the correlation terms.

Figure 8:
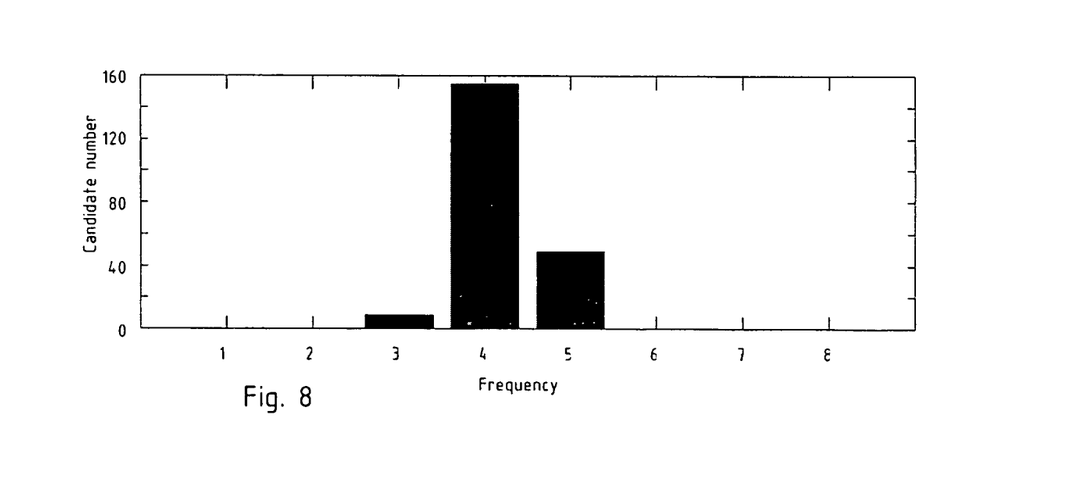

FIG. 8 represents a histogram of the frequency shift distribution of the 256 strongest peaks in the plot of FIG. 7. All the candidate peaks are in fact result of the cross-correlation of the PRN2 code sequence from the second satellite, and completely mask the correlation peak of the first space vehicle.

Figure 3:
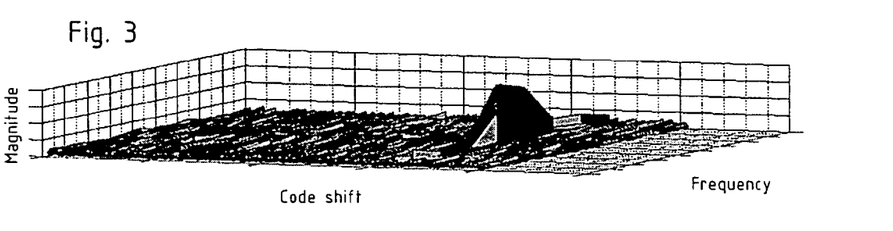
FIGS. 3 and 4 show a typical example of an acquisition process, presented as a three-dimensional plot, and the distribution of frequencies of a set of cross-correlation peaks, in the ideal case of a single peak acquisition, with no noise or cross-interference terms.
Figure 4:
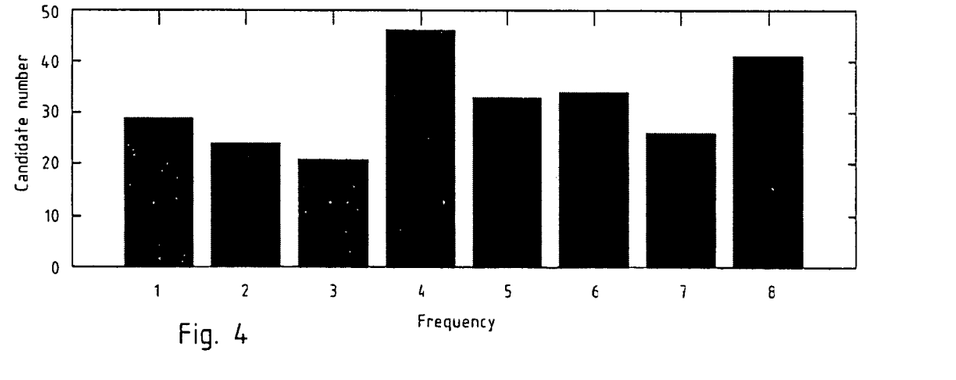
Figure 5:
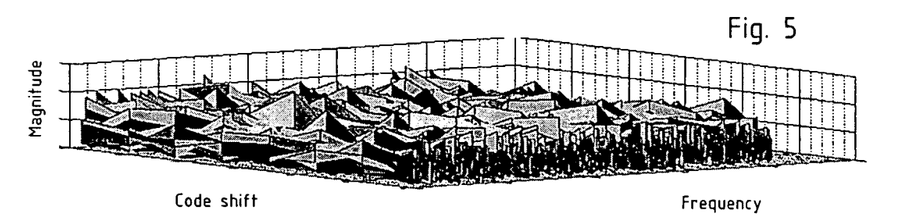
FIGS. 5 and 6 correspond to FIGS. 3 and 4 in the case in which at the input is present only noise.
Figure 6:
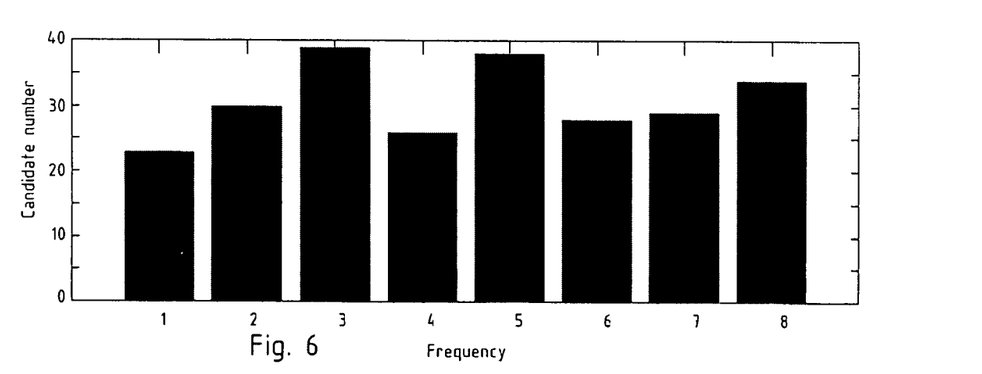

Because of the apparent frequency shift of cross-correlation peaks discussed above, all the candidate peaks of FIG. 8 appear to have the same frequency which is, in fact, the frequency of the strong PRN2 signal modulo 1 kHz. The frequency distribution of these candidate peaks exhibits thus a marked peak at the frequency $f_2$. In an ideal case with no cross-correlation or noise, as exemplified by FIGS. 3 and 4, the candidate peak due to the actual signal is clearly visible. Statistical fluctuations of the noise floor would instead be uniformly distributed in frequency, as shown in FIGS. 5 and 6.

It appears therefore that a statistical analysis of the frequencies of the strongest peaks in an incoherent integration run can lead to the identification of cross-correlation. The characteristic trait of a situation of cross-correlation is that the frequency of the strongest peaks tends to concentrate around few frequency values spaced by one kHz (or more if there be several cross-interferers), whereas a more or less uniform distribution of the frequency of the candidate peaks indicates the absence of cross-correlation.

The radiolocalization receiver of the present invention includes a cross-correlation detection module, operatively arranged to detect a cross-correlation interference during the acquisition phase of the on the base of the frequencies, or of the frequency distribution of the correlation bins.

Several known statistical techniques could be implemented in the cross-correlation detection module of the invention, for example:

the cross-correlation detection module could be arranged to detect a cross-correlation interference if the peaks in the correlation bins have mutually similar frequencies;
the cross-correlation detection module could be arranged to detect a cross-correlation interference if the distribution of the frequencies of the candidate peaks is different from a uniform distribution.
the cross-correlation detection module could be arranged to compute the probability that the frequencies of the candidate peaks are uniformly distributed, and to detect a cross-correlation interference if the probability is lower than a predetermined threshold.

The discrimination could be further improved by making use of the amplitude of the candidate peaks, as well as of their frequency. It can be seen from FIGS. 3 and 4 that the false peaks created by cross-correlation have all essentially the same amplitude, thus the cross-correlation detector could be arranged not to detect a cross-correlation interference if the candidate peaks have, statistically, similar frequencies but dissimilar amplitudes. In this way the system can distinguish among cross-correlation and auto-correlation of the searched PRN with phase-shifted copies of itself, which generate a uniform distribution of false peaks, but with an amplitude considerably lower that the true correlation peak.

The flow of operations of a peak acquisition in a radiolocalization receiver having a cross-correlation detection module according to the present invention will now be described, by way of example, with reference to FIG. 9.

Figure 9:
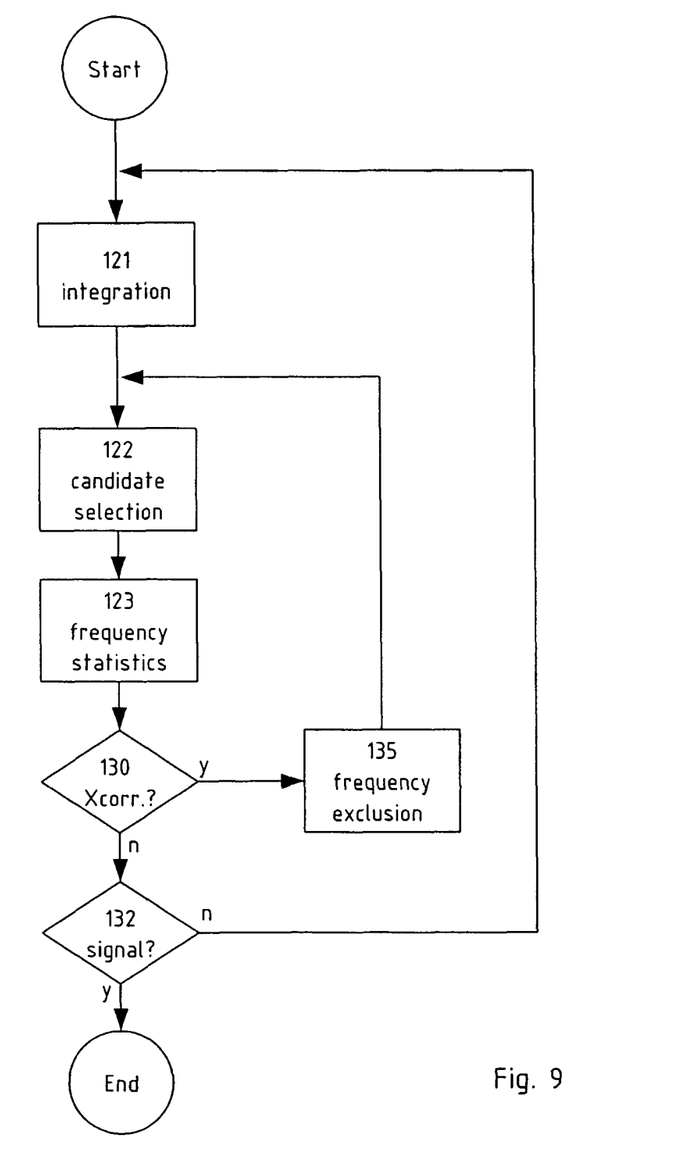

FIG. 9 refers to a method for acquiring satellite signals in a radiolocalization receiver, the receiver comprising: correlation units for processing a signal from radiolocalization transmitters, operatively arranged for correlating the signal from the radiolocalization transmitters with a plurality of replica codes, each replica code having a determined code shift and a determined frequency, integration units, for accumulating the output of the taps of the correlation unit, each correlation tap corresponding to a determined replica code having a determined combination of phase shift and frequency of the replica code, the method comprising, as it will be explained in detail later, a step 122 of candidate peak selection in which a subset of taps having strong correlation values is selected, and is characterized by a step of cross-correlation detection 123, 130, in which it is detected whether the frequencies of the candidate peaks are compatible with a uniform distribution, or with a distribution indicative of a cross-correlation.

Step 121 represents time integration, usually incoherent time integration, of a plurality of correlation signal issuing from a plurality of taps, as described above, all relative to a common PRN sequence characteristic of a particular space vehicle that the receiver is trying to acquire.

After a predetermined integration interval, integrated outputs of the taps are scanned and the strongest values are selected as candidate peaks (step 122). This can be done, by software or hardware, in several known ways. For example a group of hardware comparators can select only those taps outputs exceeding a certain threshold. The threshold is typically a running threshold, suitably adjusted by software to select, on average, a manageable number of candidates based on known integration time and noise level.

In step 123 the frequencies of the candidate peaks are examined to detect whether they are compatible with a uniform distribution, or with a distribution indicative of a cross-correlation. Many statistical tests are available to this purpose, and all are included in the scope of the present invention. For example the histogram of FIG. 4 could be filled and tested, or the frequency spread of the candidate peaks could be computed.

Decision 130 is based on the result of the preceding analysis 123. If a cross-correlation is detected, all or most of the peaks will have the same frequency, as seen before. The system can then exclude the taps at the incriminated frequency (step 135) and go back to the candidate selection step 122. The system will then select the strongest peaks having a frequency outside the band at which the cross-interference is present, thus giving a reasonable probability of finding the searched signal among them.

This exclusion of a frequency is does not reduce acquisition performance. Any useful signal hidden in the excluded band would quickly move out of it, due to variable Doppler shifts.

Other ways to obviate cross-correlation are possible. The system of the invention could for example give up this particular acquisition and attempt the acquisition of another satellite. If the frequency of the cross-correlating interference does not correspond to any signal already found, the system could start another search for a strong signal at this particular frequency. If, on the contrary the interfering satellite and its PRN are known to the system, the interfering signal could be subtracted, by known methods.

Once the system has determined that the candidate sample is free from cross-correlation (branch "n" of step 130), the candidate sample is again examined to determine if it contains a valid peak. This can be obtained by several known techniques, for example by comparing the correlation levels with a threshold, much in the same way as in step 122, but setting a higher threshold level.

In case no peak is found, the system reiterates the integration (step 121) until the search is successful, or a decision to give up on this particular space vehicle is taken (not represented). Preferably, successive longer iteration are performed on a reduced set of candidates, for example candidates selected in step 122, in order to free system resources for other tasks.

The method used in the invention allows a simple and fast detection of cross-correlation interference, and has the advantage that it is solely based on correlation levels, available in the acquisition phase, even before any satellite signal has been found. The method used in the invention allows an optimal use of the computational resources, in that it discards those taps which are dominated by cross-correlation, and concentrates the searches on those taps that offer a higher probability of containing a useful signal.

The invention claimed is:

1. An apparatus for use with a radiolocalization receiver, the apparatus comprising:
   a peak selection module to select candidate peaks based on accumulated correlation data associated with a signal received by the radiolocalization receiver; and
   a cross-correlation detection module to detect that a cross-correlation interference is associated with at least one of the candidate peaks based, at least in part, on a determination that a distribution of frequencies of the candidate peaks is different from a uniform distribution, and a determination that the candidate peaks have similar amplitudes.

2. The apparatus of claim 1, the cross-correlation detection module to further detect the cross-correlation interference further based, at least in part, on a determination that the candidate peaks are associated with mutually similar frequencies.

3. The apparatus of claim 1, wherein the cross-correlation detection module determines a probability that the distribution is different from the uniform distribution and compares the probability to a threshold.

4. The apparatus of claim 1, the cross-correlation detection module to not detect the cross-correlation interference based, at least in part, on a determination that the candidate peaks have similar frequencies and dissimilar amplitudes.

5. The apparatus of claim 1, the cross-correlation detection module to further identify a portion of the accumulated correlation data to be operatively excluded from a subsequent candidate peak selection performed by the peak selection module based, at least in part, on the detected cross-correlation interference.

6. The apparatus of claim 1, the cross-correlation detection module to further initiate an acquisition of a different code sequence by the radiolocalization receiver, in response to the detected cross-correlation interference.

7. Method for use in acquiring satellite signals in a radiolocalization receiver, the method comprising:
   selecting candidate peaks based on accumulated correlation data associated with a signal received by the radiolocalization receiver; and
   detecting that a cross-correlation interference is associated with at least one of the candidate peaks based, at least in part, on a determination that a distribution of frequencies of the candidate peaks is different from a uniform distribution, and a determination that at least a portion of the candidate peaks have similar amplitudes.

8. The method of claim 7, further comprising detecting the cross-correlation interference based, at least in part, on a determination that the candidate peaks are associated with mutually similar frequencies.

9. The method of claim 7, wherein detecting that a cross-correlation interference further comprises:
   determining a probability that the distribution is different from the uniform distribution; and
   comparing the probability to a threshold.

10. The method of claim 7, wherein detecting the cross-correlation interference further comprises not detecting the cross-correlation interference based, at least in part, on a determination that the candidate peaks have similar frequencies and dissimilar amplitudes.

11. The method of claim 7, further comprising identifying a portion of the accumulated correlation data to be operatively excluded during a subsequent candidate peak selection based, at least in part, on the detected cross-correlation interference.

12. The method of claim 7, further comprising initiating an acquisition of a different code sequence by the radiolocalization receiver, in response to the detected cross-correlation interference.

13. An apparatus for use in a radiolocalization receiver, the method comprising:
   means for selecting candidate peaks based on accumulated correlation data associated with a signal received by the radiolocalization receiver; and
   means for detecting that a cross-correlation interference is associated with at least one of the candidate peaks based, at least in part, on a determination that a distribution of frequencies of the candidate peaks is different from a uniform distribution, and a determination that at least a portion of the candidate peaks have similar amplitudes.

14. The apparatus of claim 13, wherein the means for detecting the cross-correlation interference further comprises means for detecting that the cross-correlation interference is associated with the at least one of the candidate peaks further based, at least in part, on a determination that the candidate peaks are associated with mutually similar frequencies.

15. The apparatus of claim 13, the means for detecting that a cross-correlation interference further comprises:
   means for determining a probability that the distribution is different from the uniform distribution; and
   means for comparing the probability to a threshold.

16. The apparatus of claim 13, wherein the means for detecting the cross-correlation interference further comprises means for not detecting the cross-correlation interference based, at least in part, on a determination that the candidate peaks have similar frequencies and dissimilar amplitudes.

17. The apparatus of claim 13, further comprising means for identifying a portion of the accumulated correlation data to be operatively excluded during a subsequent candidate peak selection based, at least in part, on the detected cross-correlation interference.

18. The apparatus of claim 13, further comprising means for initiating an acquisition of a different code sequence by the radiolocalization receiver, in response to the detected cross-correlation interference.

19. An article for use in a radiolocalization receiver, the article comprising:
   non-transitory data storage medium having stored therein instructions executable by a processor to:
   select candidate peaks based on accumulated correlation data associated with a signal received by the radiolocalization receiver; and
   detect that a cross-correlation interference is associated with at least one of the candidate peaks based, at least in part, on a determination that a distribution of frequencies of the candidate peaks is different from a uniform distribution, and a determination that at least a portion of the candidate peaks have similar amplitudes.

20. The article of claim 19, the instructions being further executable by the processor to detect the cross-correlation interference based, at least in part, on a determination that the candidate peaks are associated with mutually similar frequencies.

21. The article of claim 19, the instructions being further executable by the processor to:
   determine a probability that the distribution is different from the uniform distribution; and
   compare the probability to a threshold.

22. The article of claim 19, the instructions being further executable by the processor to not detect the cross-correlation interference based, at least in part, on a determination that the candidate peaks have similar frequencies and dissimilar amplitudes.

23. The article of claim 19, the instructions being further executable by the processor to identify a portion of the accumulated correlation data to be operatively excluded during a subsequent candidate peak selection based, at least in part, on the detected cross-correlation interference.

24. The article of claim 19, the instructions being further executable by the processor to initiate an acquisition of a different code sequence by the radiolocalization receiver, in response to the detected cross-correlation interference.

* * * * *